United States Patent [19]

Ribble et al.

[11] 4,215,790

[45] Aug. 5, 1980

[54] GUARD FOR COMPRESSED AIR FITTING BOWL

[75] Inventors: Franklin Ribble, Arvada; G. Kenneth Russell, Castle Rock, both of Colo.

[73] Assignee: Wilkerson Corporation, Englewood, Colo.

[21] Appl. No.: 38,664

[22] Filed: May 14, 1979

[51] Int. Cl.² ........................ B65D 41/06; B01D 31/00
[52] U.S. Cl. .................................. 220/240; 184/55 A; 220/82 R; 220/293
[58] Field of Search ...................... 220/82 R, 240, 293; 184/55 A

[56] References Cited

U.S. PATENT DOCUMENTS

| | | | |
|---|---|---|---|
| 3,182,750 | 5/1965 | Gleason | 220/82 R |
| 3,214,054 | 10/1965 | Poethig | 220/240 |
| 3,507,098 | 4/1970 | Veres | 220/293 |

Primary Examiner—George E. Lowrance
Attorney, Agent, or Firm—Ralph F. Crandell

[57] ABSTRACT

A bowl guard for mounting, containing and protecting a plastic or glass bowl of a compressed air system device. The bowl guard holds, protects and retains an opaque, transparent or translucent bowl such as a bowl which encloses a filter or lubricator device. The bowl guard is secured to a header of the device and locks the bowl in a sealed relationship with the header. The guard may have apertures so that the contents of the bowl may be observed. A drain through the bowl and guard can be provided when appropriate. A locking pin on the bowl guard insures that the entire assembly is held in alignment. When the bowl guard is latched into place and the system is under pressure the guard may not easily be withdrawn.

2 Claims, 13 Drawing Figures

GUARD FOR COMPRESSED AIR FITTING BOWL

BACKGROUND OF THE INVENTION

1. Field of Invention

The present invention relates to compressed air fittings, and more particularly to the mounting of a glass or plastic bowl on such a fitting or device. Such bowls are utilized for containing therein air filters, lubricators and like accessories, and may be transparent or translucent so the bowl contents may be observed.

2. Description of Prior Art

It is desirable in the use of compressed air to filter out impurities and water, or to add lubricants to the air. Filter and baffle systems and lubrication systems housed in a pressurized bowl or similar container have been used in the past for these purposes. Other bowls have been designed to mount into a fitting header by direct connection means. The connection is usually done by making the bowl with an upper flange engaged by a locking ring which secures the bowl to the header. The locking ring typically connects by a threaded or tongue and slot mechanism.

In the use of compressed air, it is inevitable that the bowl will come into destructive contact with external objects or incompatible materials while on the job. Fracture of a bowl under high pressure conditions can be dangerous and safety problems are inherent. Regulations have been promulgated under OSHA, by the United States Government requiring these bowls to have guards to protect against shattering during use.

OBJECTS AND SUMMARY OF THE INVENTION

It is the principle object of the present invention to provide an improved simple mounting and guard device for retaining and holding glass or plastic bowls within compressed air fittings such as those used for air filters and lubricators, without modifying the basic shape of the bowl.

It is another object of the present invention to maintain the transparent quality of polycarbonate type bowls while affording the protection of a metal guard against impact damage to the bowl, and at the same time provide a simple and effective mounting mechanism for mounting the bowl on the fitting.

It is still another and further object of the present invention to securely lock the bowl into a header, such as those used to hold air filters, lubricators or other accessories, by a bowl guard which can be easily locked or unlocked from the fitting device.

In accordance with the present invention, therefore, a compressed air fitting includes a body or header, a plastic or glass bowl, which may be opaque, transparent or translucent, and a guard which not only protects and contains the bowl, but also secures the bowl to the fitting device. The header attaches to a compressed air line and directs air through an inlet port, through a filter and baffle system or a lubricator mounted into the header and through an outlet. The bowl is in turn held in the header by the mounting of the guard.

The guard is so constructed that it snugly conforms to the shape of the bowl. Mounting nipples or lugs on the guard engage in locking notches in the header and, by rotating the guard, the nipples slide within a groove or track in the header until the mounting nipples align in locking engagement with body ribs on the header. The guard is provided with a releasable spring biased lock pin which engages in a locking notch of the header circumferentially adjacent to a body rib, thereby maintaining locking alignment of the mounting nipples of the guard and the body ribs on the header. Thus mounted, the guard holds the bowl securely in sealing engagement within the header. The guard may have apertures along its length and around its circumference so that the contents of the bowl can be observed and drained or filled when deemed necessary.

DESCRIPTION OF THE PREFERRED EMBODIMENT

Figure 1:
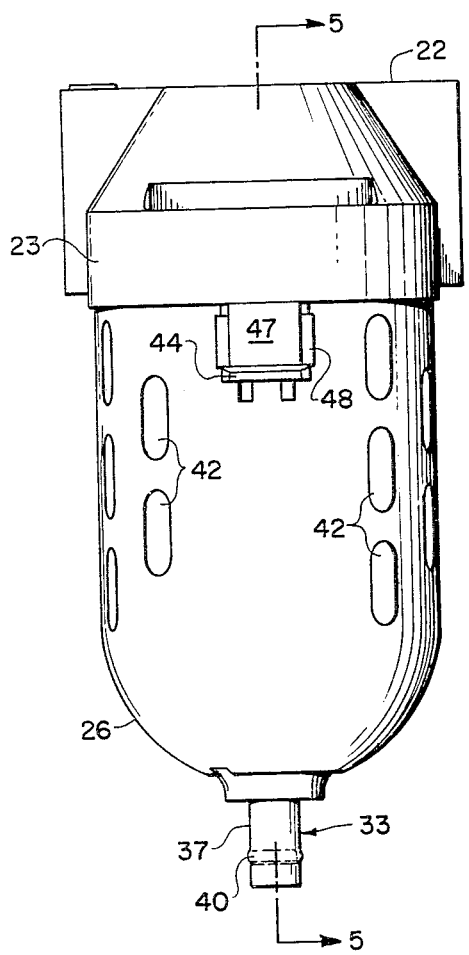
FIG. 1 is an elevation view of an assembled compressed air fitting header, bowl and bowl guard.
Figure 2:
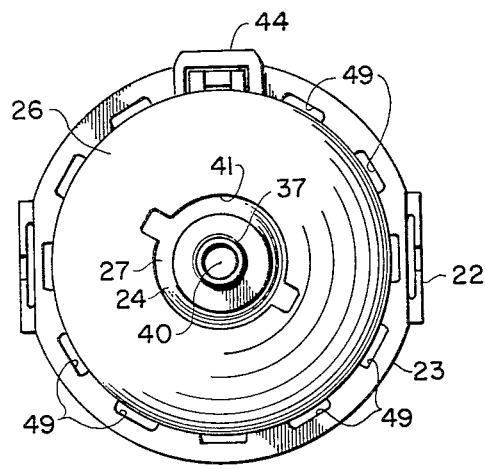
FIG. 2 is a bottom end view of the assembly shown in FIG. 1.
Figure 3:
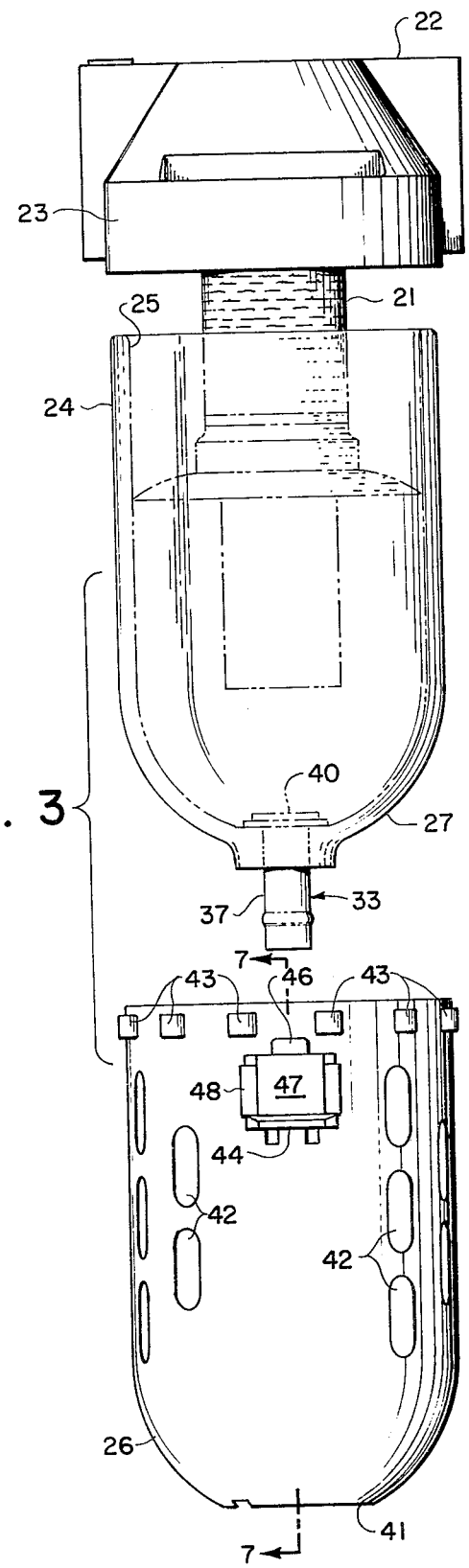
FIG. 3 is an exploded elevation view of the compressed air fitting header, bowl and bowl guard shown in FIG. 1.
Figure 4:
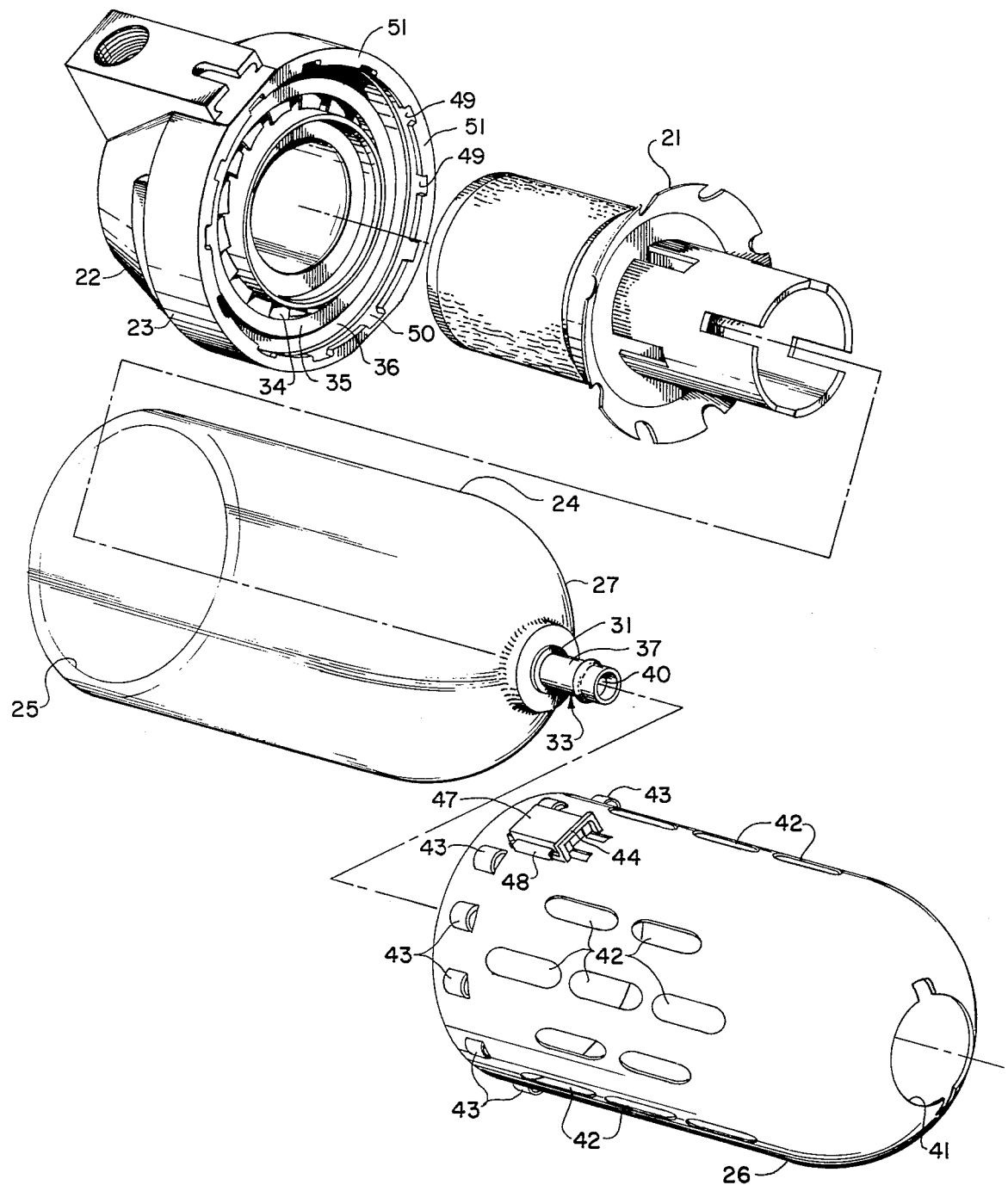
FIG. 4 is an exploded perspective view of the compressed air fitting header including a filter, bowl and bowl guard.
Figure 5:
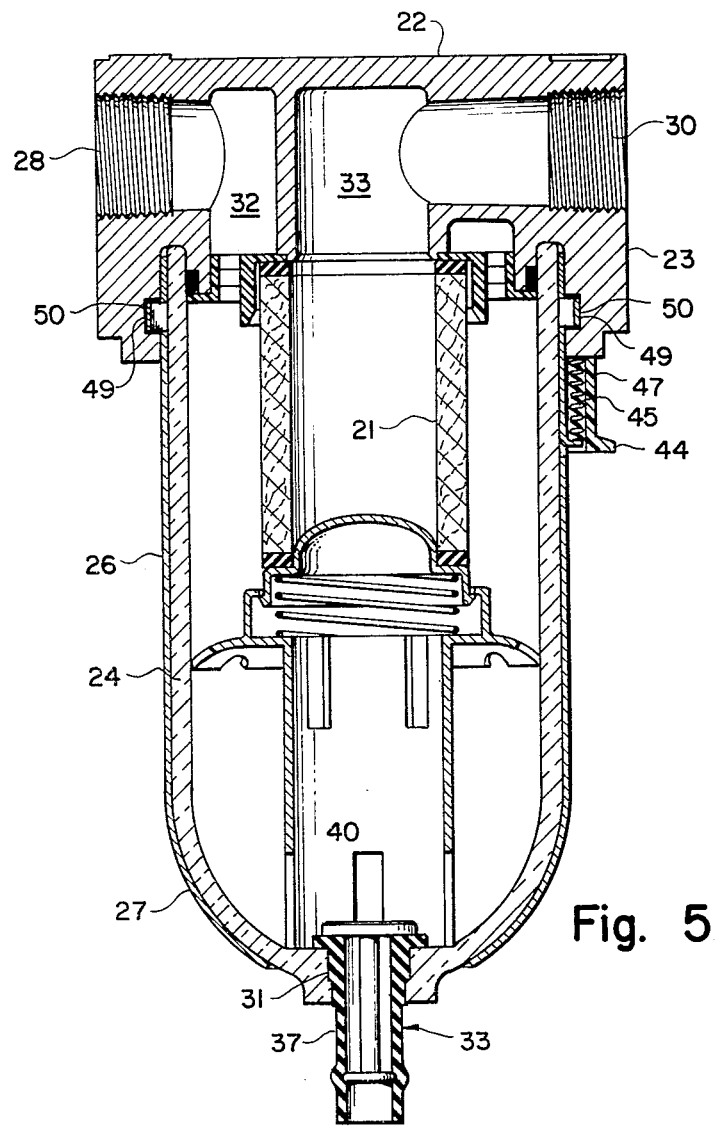
FIG. 5 is an enlarged section view taken substantially in the plane of line 5—5 on FIG. 1.
Figure 6:
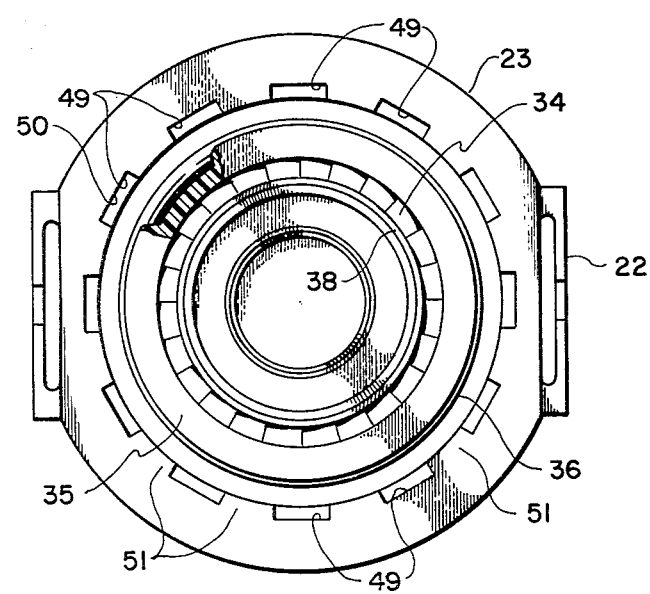
FIG. 6 is a bottom view of the header shown in FIG. 4.
Figure 8:
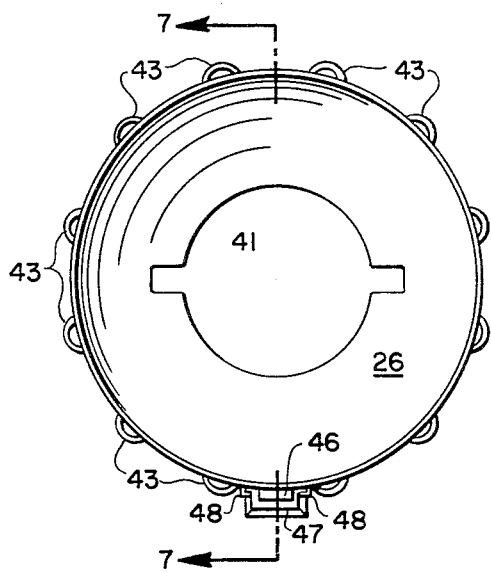
FIG. 8 is a bottom view of the guard shown in FIG. 7.
Figure 9:
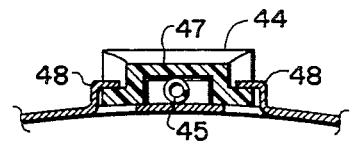
FIG. 9 is an enlarged section view of the lock pin taken substantially in the plane of line 9—9 on FIG. 7.
Figure 7:
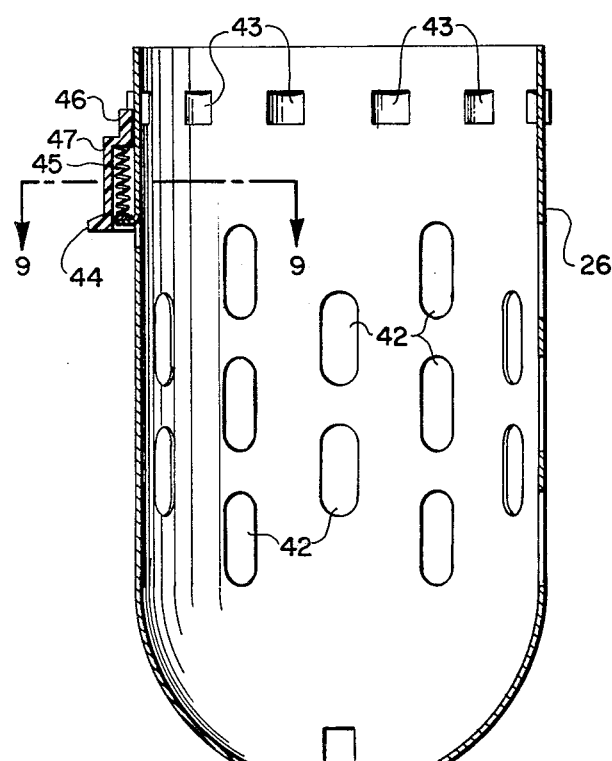
FIG. 7 is an enlarged section view of the guard taken substantially in the plane of line 7—7 on FIG. 3.

The present invention is embodied in an improved bowl guard for mounting, retaining and protecting rigid plastic or glass bowls used in compressed air applications. The primary component parts include a fitting body or header 22, a bowl 24, and the guard 26, which can be constructed of a strong, lightweight non-fracturable material like aluminum. The header 22 is threaded into a compressed air line (not shown). The header 22 has an inlet 28, through which the header receives compressed air, and an outlet 30 through which compressed air exits the device.

Once compressed air enters the header 22, it passes through the inlet 28 into an intake chamber 32, which directs the flow at a right angle downward from the compressed air line through louvres 34. These louvres 34 are angled relative to the flow from the intake chamber 32 so that the compressed air is directed in a circular motion about the circumference of the bowl 24. This action permits any accessory, like an air filter, to have maximum contact with the flow of compressed air.

The compressed air is then allowed to exit the bowl 24 through the exit chamber 33 of the header 22 and is sent through the outlet 30 back into the compressed air ine. The header 22 is generally circular in shape with diametrically extending fitting portions for engagement with the compressed air line and a depending annular skirt 23 defining a circumferential opening for receiving the bowl 24 and guard 26. The header 22 can be of steel alloy, aluminum or other appropriate material. To facilitate attachments of a compressed air line, both the inlet 28 and the outlet 30 are aligned along a diameter dissecting the header 22.

For sealing the bowl in mounting engagement with the header, an O-ring seal 36 is provided immediately adjacent the outer circumference of a bowl receiving groove 35, which is circumferentially adjacent the louvres 34. Adjacent the inner circumference of the louvres 34, there is provided a fitting 38, adapted to sealably and snuggly fit and retain in the header a filter element or other accessory. The accessories are dimensioned so that the bowl 24, when mounted by use of the guard 26, holds the accessory within the fitting and thereby within the header 22. The O-ring seal 36, louvres 34, bowl receiving grooves 35, and fitting 38 are preferably made of a light plastic, rubber or like material capable of forming a seal with the parts in the relationships described above.

The bowl 24 is of generally cylindrical shape having one circular open end 25 and an oposite end 27 of hemispherical dome shape. It is desirable for some applications of the present invention that the contents of the device be visible, for example in the draining of excess water from the bowl and the accessory held and retained therein without interrupting operation by disconnection of the accessory. In order to accomplish this, the bowl 24 may be of translucent or transparent quality, which characteristic is best achieved through use of a glass, or clear plastic material such as polycarbonate plastic. To accomplish the actual draining, the domed end 27 of the bowl 24 can have a bore 31 therethrough in which is mounted a drain valve 33, for example, where the blow 24 is used to support an air filter. One form of drain valve is described in U.S. Pat. No. 3,450,146 issued June 17, 1969 to R. A. Edwards, for Drain Valve. The drain valve 33 is formed by a tubular rubber insert 37 into which is inserted a disc valve 40. Manual tilting of the rubber insert 37 and disc valve 40 permits the contents of the bowl 24 to discharge from the bowl 24 under bowl air pressure.

To protect, retain and hold the bowl 24 into the header 22, there is provided a mounting guard 26 which conforms generally to the exterior shape of the bowl 24 thereby to securely retain the bowl 24 and protect it against a damaging impact. This conformable fit also insures maximum space utilization and weight saving advantages. As with the bowl 24, the domed end of the guard 26 may have a drain valve aperture 41 through which protrudes the drain valve 33 extending from the bowl 24. Where the bowl is translucent or transparent for insuring that the contents of the bowl 24 can be observed at all times, the guard 26 is provided with observation apertures 42 along the longitudinal length of the guard 26 and extending circumferentially around the guard 26.

The guard 26 also holds and retains the bowl 24 securely in sealed relation within the header 22 and surrounding associated fittings, like the O-ring seal 36. For accomplishing this purpose, the guard 26 is formed with circumferentially spaced mounting nipples 43 adjacent to the open end. The mounting nipples 43 are stamped or pressed from the guard 26 itself or may be securely affixed thereto. The open end of the bowl 24 is cylindrically shaped without flanges, nipples, outward extensions, threading or other means to directly join the bowl 24 to the header 22. The simplicity of the bowl substantially reduces problems associated with manufacturing the bowl 24, such as more expensive and complicated mold configuration. This also eliminates one step in the mounting process or disconnect process, as a user must necessarily remove the guard 26 in any event.

For engaging the guard, the skirt 32 of the header 22 is provided with circumferential inwardly directed notches 49 spaced and numbered to receive the corresponding mounting nipples 43 on the guard 26. The notches 49 are defined by spaced body ribs 51 overhanging a groove or track 50 adapted to receive the nipples 43. Once the guard 26 and associate mounting nipples 43 have been inserted into the header 22 to the extent possible, the mounting nipples 43 are circumferentially aligned with the nipple track 50. The nipple track 50 extends circumferentially about the interior of the header 22 at a point vertically adjacent to the body ribs 51 and notches 49. By inserting the nipples 43 into the notches 49 and turning the guard 26, the nipples 43 slide in the track to a locking position in the back of the ribs 51.

For retaining the guard 26 in locked position, a locking pin 44 is joined to the side of the guard 26. The locking pin 44 includes a tongue 46 adapted to be urged into a locking notch 49 by a locking pin spring 45. The lock pin spring 45 experts a force along a line parallel to the longitudinal axis of the guard 26, thereby inserting the tongue 46 into a locking notch 49.

To disengage the lock pin 44, a user exerts a force on a finger pad 47 opposite to that of the lock pin spring 45. The entire lock pin 44 is held against the side of the guard 26 by a pair of lock pin retainers 48 angling outwardly and inwardly over the lock pin 44 from the guard 26 which permit sliding of the finger pad 47 relative to the guard 26. The lock pin 44 is so positioned that, upon initial insertion of the guard over the contained bowl and into the header (see FIGS. 11 and 12), the tongue 46 is in direct alignment with a body rib 51 which automatically biases the lock pin spring 45. When the guard 26 is inserted into the header 22, the nipples 43 align circumferentially with the nipple track 50, and the lock pin spring 45 is compressed by engagement of the tongue 46 with a rib 51. The guard is then ready to be turned and locked into place.

Figure 10:
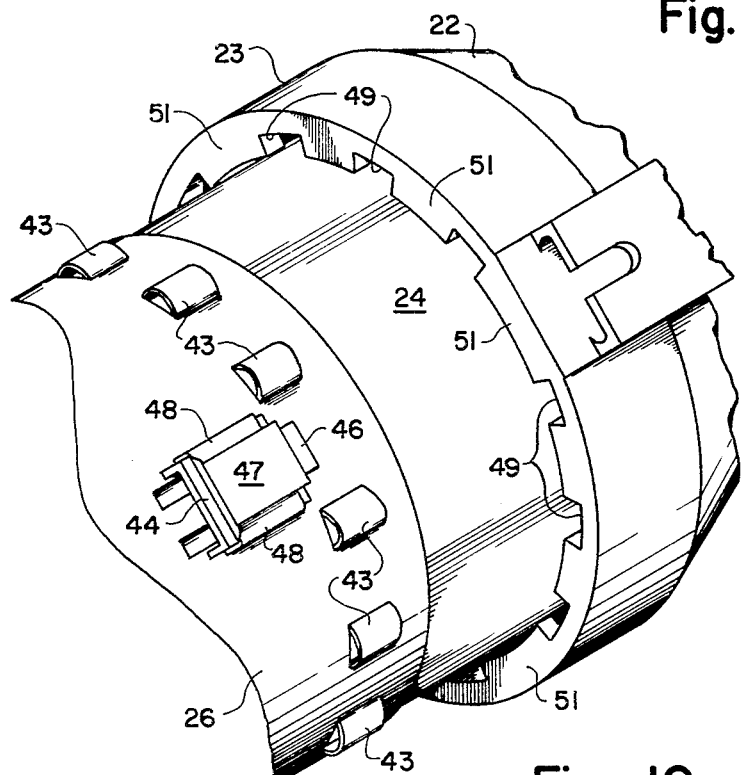
FIG. 10 is an enlarged partial perspective view of the header with a bowl in place but with the bowl guard and the lock pin slightly withdrawn from the header.
Figure 11:
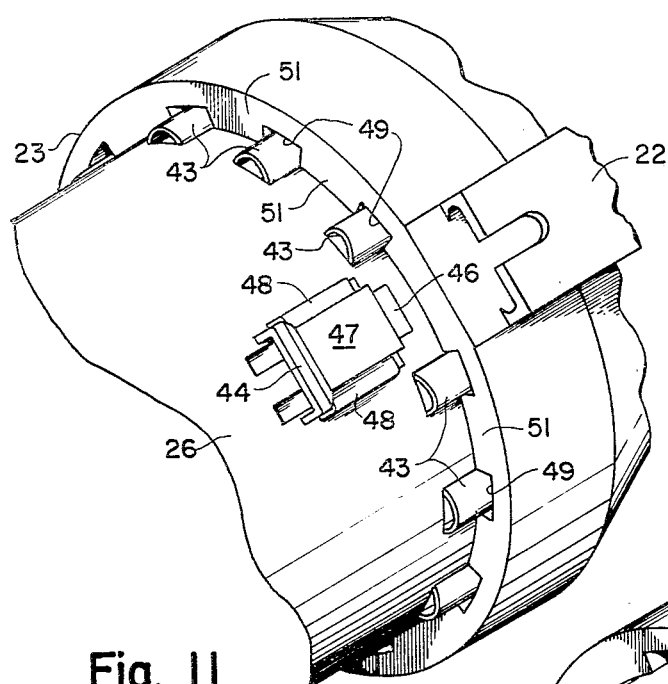
FIG. 11 is an enlarged partial perspective view similar to FIG. 10, but showing the bowl guard in initial engagement with the header.
Figure 12:
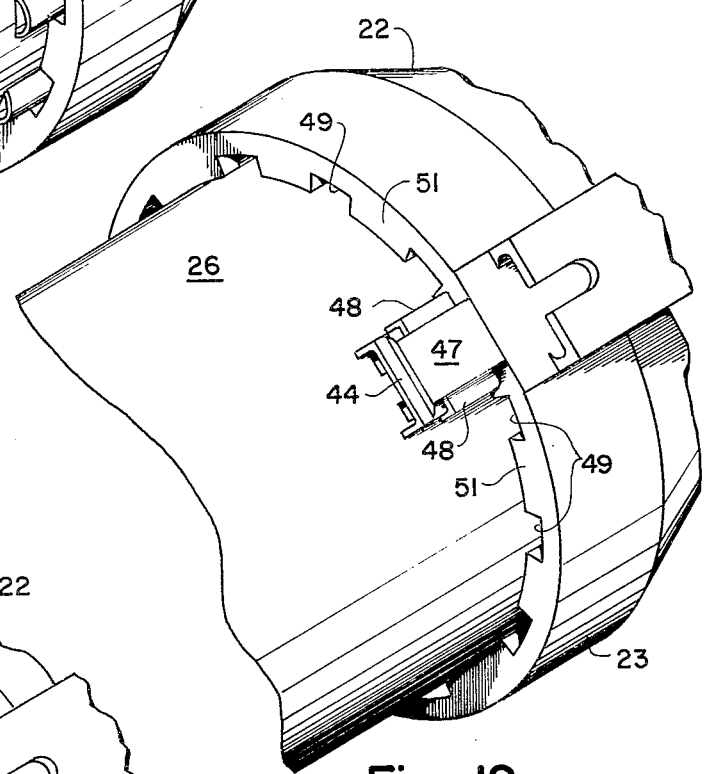
FIG. 12 is a view similar to FIG. 11, but showing the bowl guard fully inserted into the header.

To summarize the mounting procedure, the bowl 24 is inserted into the header 22 forming a sealing engagement with the O-ring 36, and the guard 26 is slipped over the bowl (FIG. 10). The mounting nipples 43 on the guard 26 are aligned with and inserted into corresponding locking notches 49 in the header 22 (FIG. 11). The guard 26 is then fully inserted to the point where the mounting nipples 43 are in circumferential alignment with the nipple track 50 (FIG. 12), at which point the tongue 46 of the lock pin 44 has been depressed relative to the lock pin retainers 48 by the interference created by a body rib 51.

Figure 13:
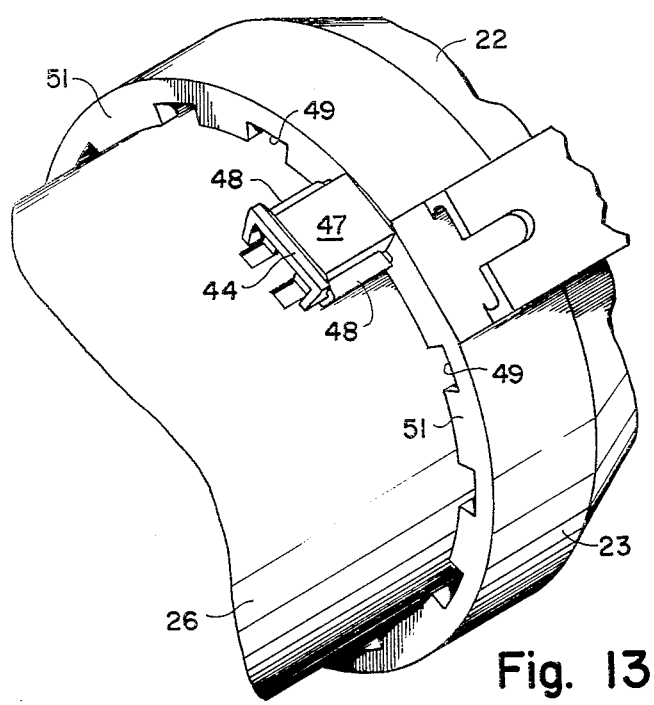
FIG. 13 is a view similar to FIG. 12, but showing the bowl guard rotated and locked in place in the header.

To lock the guard to the header 22, the guard is rotated in either direction (FIG. 13). In the locking position, the mounting nipples 43 are in direct alignment along a longitudinal axis with the body ribs 51 of the header 22. It will be appreciated that the locking notches 49, through which the mounting nipples 43 were initially inserted, are each circumferentially adjacent to a body rib 51 so that rotation equal to one locking notch is all that is required to align the mounting nipple with a corresponding body rib in the nipple track 50. In this position (FIG. 13), the tongue of the locking pin snaps into a locking notch 49. Rotation beyond that locking notch cannot occur as long as the lock pin spring 45 continues to hold the tongue 46 within the locking notch. Disconnection between the guard 26 and contained bowl 24 and the header 22 is accomplished by manually pushing the finger pad 47 in a direction opposite to that of the force exerted by the lock pin spring 45 followed by rotation of the guard 26, in either direction, to the position in which the locking notches 44 and mounting nipples 43 are in alignment. The guard 26 and protected bowl 24 can then be withdrawn from the header 22.

A further safety feature of the present invention results from the fact that once the compressed air line is pressurized, the high pressure existing within the interior of the bowl 24 forces the bowl 24 tightly into the guard 26. This force, acting along the longitudinal axis of the bowl 24 and guard 26, frictionally locks the mounting nipples 43 to the body ribs 51 which tend to prevent removal of the guard 26 so long as the bowl 24 is under pressure.

The embodiment shown in the drawings illustrates an air filter 21. Within the header 22 there is provided a filter fitting 38 within which the air filter 21 is seated. Although an air filter 21 is shown in the drawings, the present invention is not limited to use with air filters alone, but can also be utilized to mount, hold and protect such compressed air lines accessories as lubricators.

While an illustrative embodiment of the present invention has been described in considerable detail, it should be understood that there is no intention to limit the invention to the specific form disclosed. On the contrary, it is the intention to cover all modifications, equivalents, alternatives and uses of the present invention falling within the spirit and scope of the invention as particularly expressed in the appended claims.

What we claim as our invention:

1. A compressed air fitting device, comprising in combination:
    a header having an inlet and an outlet for compressed air, and including a depending skirt defining a bowl receiving opening intermediate said inlet and outlet;
    a transparent bowl having an open end adapted to be received in said bowl receiving opening in said header, said bowl further having a domed end having a bore therethrough;
    a drain valve retained within the bore of the domed end of said bowl for draining the interior contents of the bowl;
    an O-ring seal in said depending skirt for sealably engaging the open end of said bowl;
    an impact resistant metal bowl guard conformably fitting said bowl in exterior surrounding protective relationship therewith, said guard having a plurality of observation openings therein for observing the contents of the bowl to be monitored and selectively drained through the drain valve, said bowl guard further having at the domed end thereof an aperture through which said drain valve protrudes;
    a plurality of inwardly directed body ribs alternating with locking notches arrayed about the inward circumference of said bowl receiving opening in said header;
    mounting nipples circumferentially spaced around the open end of said guard adapted to be interspersed between said body ribs through said locking notches, said mounting nipples being integrally formed adjacent the open end of said metal bowl guard;
    a nipple track vertically adjacent to said locking notches and body ribs of said depending skirt providing for rotation of said nipples of said guard within said track to a position wherein said nipples are vertically adjacent to said body ribs for retaining said guard in engagement with said skirt; and
    a locking pin tongue biased by a locking pin spring, affixed to said guard, said tongue so positioned that upon engagement of said guard mounting nipples into said locking notches of said depending skirt, said tongue is biased by interference with one of said body ribs, and upon rotation of said mounting nipples within said nipple track said tongue protrudes into a locking notch thereby preventing further rotation of said guard relative to said header and aligning said mounting nipples with said body ribs.

2. A compressed air fitting device, comprising in combination:
    a header having an inlet and an outlet for compressed air, and including a depending skirt defining a bowl receiving opening intermediate said inlet and outlet;
    a transparent bowl having an open end adapted to be received in said bowl receiving opening in said header;
    an O-ring seal in said depending skirt for sealably engaging the open end of said bowl;
    an impact resistant metal bowl guard conformably fitting said bowl in exterior surrounding protective relationship therewith, said guard having a plurality of observation openings therein for observing the contents of the bowl to be monitored and selectively drained through the drain valve;
    a plurality of inwardly directed body ribs alternating with locking notches arrayed about the inward circumference of said bowl receiving opening in said header;
    mounting nipples circumferentially spaced around the open end of said guard adapted to be interspersed between said body ribs through said locking notches, said mounting nipples being integrally formed adjacent the open end of said metal bowl guard;
    a nipple track vertically adjacent to said locking notches and body ribs of said depending skirt providing for rotation of said nipples of said guard within said track to a position wherein said nipples are vertically adjacent to said body ribs for retaining said guard in engagement with said skirt; and
    a locking pin tongue biased by a locking pin spring, affixed to said guard, said tongue so positioned that upon engagement of said guard mounting nipples into said locking notches of said depending skirt, said tongue is biased by interference with one of said body ribs, and upon rotation of said mounting nipples within said nipple track said tongue protrudes into a locking notch thereby preventing further rotation of said guard relative to said header and aligning said mounting nipples with said body ribs.

* * * * *